UNITED STATES PATENT OFFICE.

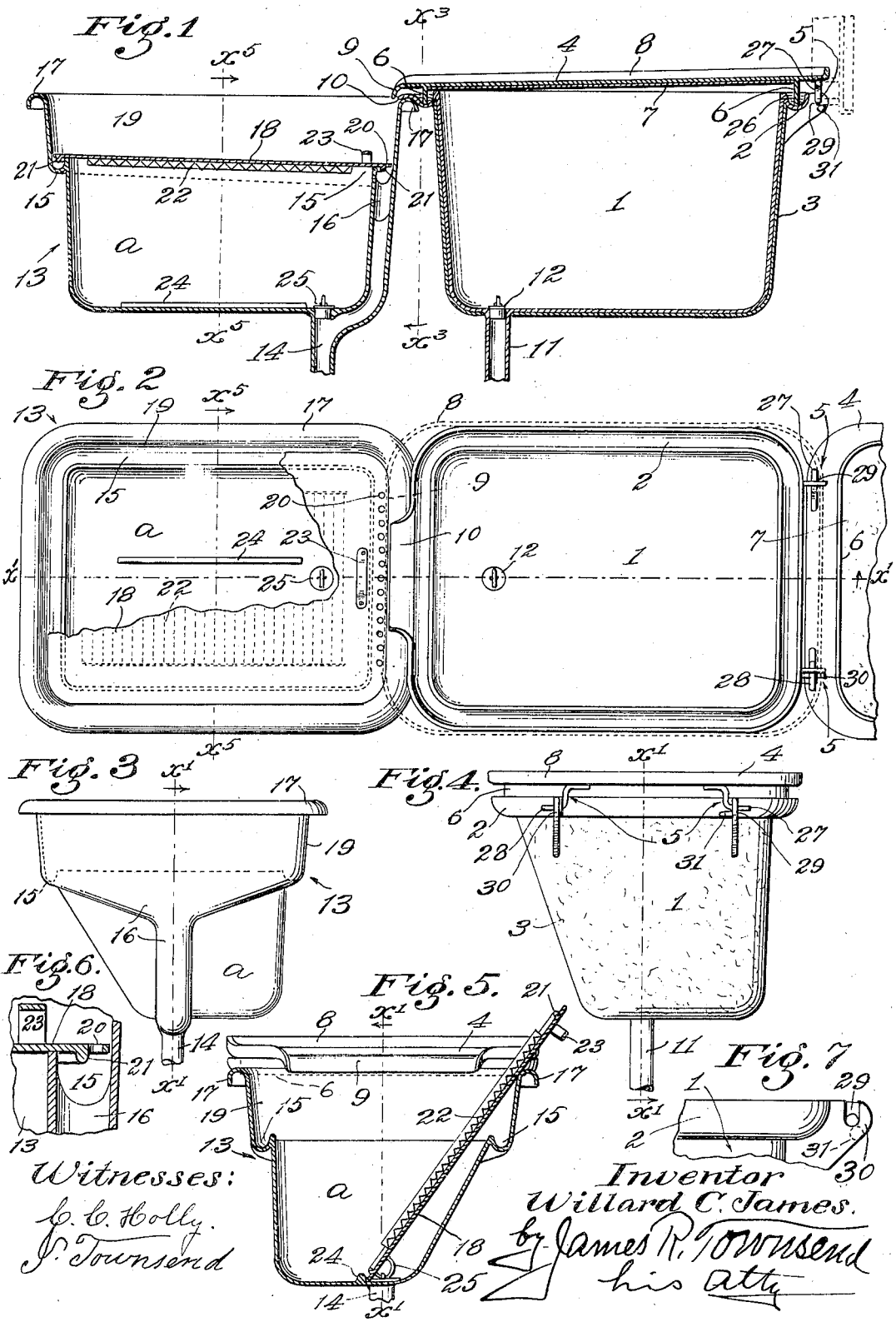

WILLARD C. JAMES, OF LOS ANGELES, CALIFORNIA.

COMBINED LAUNDRY, KITCHEN, AND PANTRY APPLIANCE.

1,102,412.

Specification of Letters Patent.  Patented July 7, 1914.

Application filed July 8, 1907. Serial No. 382,774.

*To all whom it may concern:*

Be it known that I, WILLARD C. JAMES, a citizen of the United States, residing at Los Angeles, in the county of Los Angeles and State of California, have invented a new and useful Combined Laundry, Kitchen, and Pantry Appliance, of which the following is a specification.

This invention relates to condensed furniture.

An object of the invention is to provide an increased number of utilities in a given amount of space.

Another object is to provide novel features of construction, and novel and advantageous disposition of the various utilities.

The accompanying drawings illustrate the invention.

Figure 1 is a longitudinal mid-sectional elevation on plane indicated by $x^1$—$x^1$, Figs. 2, 3, 4 and 5, of an appliance embodying this invention in position for use. Dotted lines show the combined drain-board and ice-chest lid in raised position. Fig. 2 is a plan of the same, parts being broken away to show interior construction. The drain-board lid or cover of the combined ice-chest and laundry tray or tub is shown thrown back to expose the under-face of the same; the lug which forms a stop for the hinge being broken away to allow the lid to reach this position. Dotted lines indicate lowered position of said lid. Fig. 3 is an elevation looking to the left from line $x^3$, Fig. 1. Fig. 4 is an elevation from the right of Fig. 1. Fig. 5 is a section looking to the right from plane indicated by line $x^5$—$x^5$, Figs. 1 and 2, the combined drain-board and ice-chest lid being down as in Fig. 1 and the combined sink-bottom and wash-board being shown in position for use as a wash-board. Fig. 6 is a fragmental enlarged detail of a portion of Fig. 1. Fig. 7 is a fragmental detail of a part of the lid hinge.

1 designates a bowl or receptacle adapted for use as a washtub or laundry-tray, and provided around its rim with an external channel 2 for a water-seal, and also provided with an insulating jacket 3 of asbestos or other suitable insulating material whereby the bowl 1 is made non-heat-conducting. Such bowl is designed for use as an ice-chest, refrigerating chamber, food safe and cake and bread box, and is provided with an air-tight heat insulating lid 4 that forms a combined kitchen drain-board, and an ice-chest and cake-box cover, hinged at 5 to the receptacle 1 and provided on its underside with a downwardly-projecting collar 6 to enter the channel 2 when the cover 4 is in its lowered position shown in solid lines in Fig. 1. Said lid is provided on its under-side with insulating material 7 which may correspond to that of the jacket 3.

8 designates a rim wall along the sides and across the upper end of the lid 4, which lid may terminate at its lower end in a downwardly-bent lip 9 extending beyond the rim of the receptacle 1, which also terminates on that side of said receptacle opposite the hinges 5, in a lip 10.

11 is a drainage outlet from the bottom of the receptacle 1, and 12 is a stopper for the same.

13 is a second receptacle.

The receptacles 1 and 13 are adapted to form, in combination with each other a set of stationary wash-tubs or laundry trays. The receptacle 13 is provided with a drainage outlet 14, a combined drainage gutter and sink bottom support 15 near the upper portion thereof, that slopes toward and terminates in a wide-mouthed gutter-drain 16 leading therefrom at the side near the insulated receptacle 1; the mouth of said gutter drain extending across the end of the receptacle and said drain opening downward into the drainage outlet 14. Said receptacle 13 terminates at the top in a rounded lip 17 which fits beneath the lip 10 of receptacle 1, so that overflow from channel 2 will pass into the receptacle 13, and when the drain-board 4 is in lowered position, as shown in Fig. 1, water from said drain-board may flow over the lip 17 into the gutter drain 16 at that side or end of the receptacle 13. Said receptacle 13 is composed of upper and lower portions of different diameters and cross sectional areas, forming two compartments, the lower portion or comparment *a* being of less cross sectional area than the upper portion or compartment 19.

The inner wall of the drainage-gutter 15 forms a ledge to support a combined temporary sink bottom, tub-cover and wash-board 18 which fits snugly in the flaring mouth or upper portion 19 of said tub or laundry-tray 13, at the dividing line between the two portions *a* and 19, and is provided at one end with an outlet which may be extended to form a wide discharge in the form of numerous perforations 20 above the drain 16. The top of the inner wall of gutter 15 lies in a plane which is aslant toward the gutter drain 16, so that when the cover 18 is in place, it forms a sink bottom or drainage floor and any liquid that falls into the upper portion 19 of the receptacle 13 will drain into the gutter drain 16, either directly through the passages 20 or around the edge of cover 18 and into and through the gutter 15, and thence to the drainage outlet 14.

The cover 18 fits tightly on the flat inner rim of the gutter 16 as clearly shown in Fig. 6 so as to prevent circulation of air between the interior and exterior of the receptacle 13.

21 is a downwardly-projecting continuous bead or collar extending around the rim of the cover 18 to project downwardly into the gutter 15 and drain 16 when the sink bottom and tub-cover 18 is in place, thus to cause any liquid which might flow down around the edges of the cover 18 to drip from said bead into the gutter 15 and drain 16, thereby preventing any of such liquid from entering the inside chamber of the receptacle 13.

The bead is so placed as to leave an open space between it and the gutter walls, so that no liquid will flow by capillary attraction into the lower compartment *a*. On the same side of said cover with said bead is a roughened or corrugated face 22, thereby fitting said cover to be used as a washboard, a handle 23 being provided by which the cover 18 may be handled.

24 is a stop in the bottom of the receptacle 13 against which the lower end of the combined sink bottom and washboard 18 may be set when it is desired to use the receptacle 13 as a wash-tub.

25 is a stopper for the drainage outlet 14.

In practical use, the receptacle 1 is especially valuable for storage of edibles, and may be made to serve as a refrigerator or ice-chest. The channel 2 may be filled to a greater or less extent with water to form a water seal, as indicated at 26, so that when the cover 4 is in place, as indicated in Fig. 1, and the stopper 12 is also in place, the chamber 1 will be practically closed with a hermetical seal, thus effectually excluding ants, cockroaches, and other insects from any food that may be stored in the receptacle.

The insulating material 3 and 7 preserves the stability of the temperature in the chamber of the receptacle, and by placing blocks or any other form of movable supports, (not shown), inside said receptacle, ice placed thereon in the receptacle will be doubly insulated from outside temperatures; and it is evident that whenever it is desired to drain off any of the water resulting from melting ice, this may be done by simply withdrawing the stopper 12, whereupon the water will flow out through the drainage outlet 11 which will be connected with the plumbing of the house in any manner well-known to the plumbing trade.

When the cover 4 is thus lowered in place as shown in Fig. 1, the receptacle 1 and said cover afford a drain-board to drain into the sink which, it will be observed, is formed by the receptacle 13 and the cover 18 therefor, when said cover is in place.

The drainage from the drain board 4 will flow into the sink-mouth 19 and onto the top of the cover 18 and down through the outlets 20 and thence through the drain 16 into the drainage outlet 14.

When it is desired to use the appliance for laundry purposes and but one tub is to be used, the sink bottom and tub cover 18 may be withdrawn from the ledge formed by the inner walls of the gutter 15, and may be upended in the receptacle 13 with its lower end against the stop 24, and with the corrugated side 22 in position for use as a washboard. Thereupon the tub 13 is ready to be used as a wash-tub. When it is desired to discharge water from said tub, this may be done by withdrawing the plug 25.

In case it is desired to use a set of tubs for laundry purposes, the drain-board cover 4 may be tilted back into the position indicated in dotted lines in Fig. 1, and if any ice, food, or other articles are inside the receptacle 1, the same may be removed, thus leaving the receptacle free to be used for laundry purposes. After such use, it may be restored to its former condition in an obvious way.

The drain-board cover 4 is preferably detachably connected with the receptacle 1 by means of two pintles 27, 28, an eye 29, and a hook or open bracket 30; the eye 29 being at the rear side and the open hook or bracket at the front side, or vice versa, as may be deemed expedient.

31 designates stops for the hinges to prevent the drain-board and lid 4 from being thrown back too far.

To remove the drain-board and cover 4, the pintle that is in the bracket or hook will be lifted out of the same, thereupon allowing the other pintle or hook to be drawn out of the eye which holds it when the cover is in place.

What I claim is:—

1. An article of furniture comprising two receptacles adapted to be used as wash-tubs, one being provided externally with a channel and the other internally with a gutter, the inner wall of said gutter being below the level of the tops of both receptacles, the guttered receptacle being provided with a drainage outlet leading from said gutter, a lid for one of said receptacles provided with a collar in said channel, and a washboard constructed to form a cover and to rest on said inner wall, said lid being provided with a lip extending over the cover formed by the washboard.

2. In an article of condensed furniture, a combined refrigerator, wash-tub, wash-board and drain-board, comprising two abutting tubs with drainage outlets in their bottoms, one tub being provided with heat-insulated bottom and sides and with an adjustable removable cover adapted to drain water into the second tub, and the second tub being provided with a drainage channel down into its side next to the insulated tub; said channel being arranged to receive the drainage from said cover; said second tub being provided with a channeled drainage-ledge therearound, and a movable and adjustable combined wash-board and drainage-bottom adapted to seat upon the ledge around the sides of said second tub and to drain into the channel in said ledge, and to be up-ended in said tub for use as a washboard.

3. The combination with a tub or laundry tray provided with a continuous ledge near its top, said ledge being horizontal along one end of the tub inclined along its sides, and inclined in both directions on its opposite end of a gutter extending around said ledge and sloping continuously downwardly from one end in both directions to an outlet opening in the middle of the opposite end of the tub, and a one-piece plate forming the sink bottom and extending from end to end and side to side of said tray and fixed and resting upon said ledge.

In testimony whereof, I have hereunto set my hand at Los Angeles, California, this 2d day of July 1907.

WILLARD C. JAMES.

In presence of—
JAMES R. TOWNSEND,
TILLIE E. ADAM.